United States Patent [19]
Kodama

[11] Patent Number: 5,799,127
[45] Date of Patent: Aug. 25, 1998

[54] VIDEO DATA RECORDING APPARATUS AND VIDEO DATA REPRODUCING APPARATUS

[75] Inventor: Yasumasa Kodama, Kanagawa, Japan

[73] Assignee: Sony Corporation, Tokyo, Japan

[21] Appl. No.: 611,185

[22] Filed: Mar. 5, 1996

[30] Foreign Application Priority Data

Mar. 6, 1995 [JP] Japan ................................ 7-045591

[51] Int. Cl.⁶ ........................... H04N 5/91; H04N 5/917; H04N 7/10
[52] U.S. Cl. ...................... 386/46; 386/109; 348/7
[58] Field of Search ..................... 348/7, 12, 13, 348/8, 17, 6; 455/4.1, 5.1; 386/46, 109, 111, 122, 125–27, 33; H04N 5/91, 7/00, 7/10, 7/14, 5/917

[56] References Cited

U.S. PATENT DOCUMENTS

| | | | |
|---|---|---|---|
| 5,387,927 | 2/1995 | Look et al. | 3458/6 |
| 5,568,180 | 10/1996 | Okamoto | 348/7 |
| 5,594,491 | 1/1997 | Hodge et al. | 378/7 |

FOREIGN PATENT DOCUMENTS

| | | |
|---|---|---|
| A-0 552 806 | 7/1993 | European Pat. Off. . |
| A-0 609 054 | 8/1994 | European Pat. Off. . |
| A-0 633 694 | 1/1995 | European Pat. Off. . |
| A-0 686 908 | 12/1995 | European Pat. Off. . |
| WO-A-91 03112 | 3/1991 | WIPO . |
| WO-A-92 12599 | 7/1992 | WIPO . |
| WO-A-96 13125 | 5/1996 | WIPO . |

OTHER PUBLICATIONS

Gelman A D et al.: "A Store–And–Forward Architecture For Video–On–Demand Service" Jun. 23, 1991, Communications—Rising To The Height, Denver, Jun. 23–26, 1991, vol. 2 of 3, pp. 842–846, Institute of Electrical And Electronics Engineers XP000269608 184010.

Patent Abstracts of Japan, vol. 16, No. 323 (P–1386), Jul. 15, 1992 & JP–A–04 095271 (Matsushita Electrical Ind. Co., Ltd.), Mar. 27, 1992, & JP–A–04 095271.

Computer Networks And ISDN Systems, vol. 22, No. 2, Sep. 1, 1991, pp. 155–162, XP000225399 Sincoskie W D: "System Architecture For A Large Scale Video On Demand Service".

Primary Examiner—Robert Chevalier
Attorney, Agent, or Firm—William S. Frommer; Alvin Sinderbrand

[57] ABSTRACT

A video data recording/reproducing apparatus including an input unit for inputting a number of channels, the number of channels indicating a plurality of channels on which a plurality of series of video data are transmitted, the plurality of series of video data being identical to an original series of data and having a predetermined time difference: a division unit for dividing the digital video data into the same number of blocks of data as the number of the plurality of transmission channels and dividing the blocks of data into a predetermined number of sub-blocks of data; an arrangement conversion unit for converting the arrangement of the sub-blocks of data divided by the division unit into another arrangement of sub-blocks of data in accordance with a predetermined sequence; and a recording unit for recording the converted arrangement of the sub-blocks of data from the arrangement conversion unit and data indicating the number of channels to a recording medium.

10 Claims, 9 Drawing Sheets

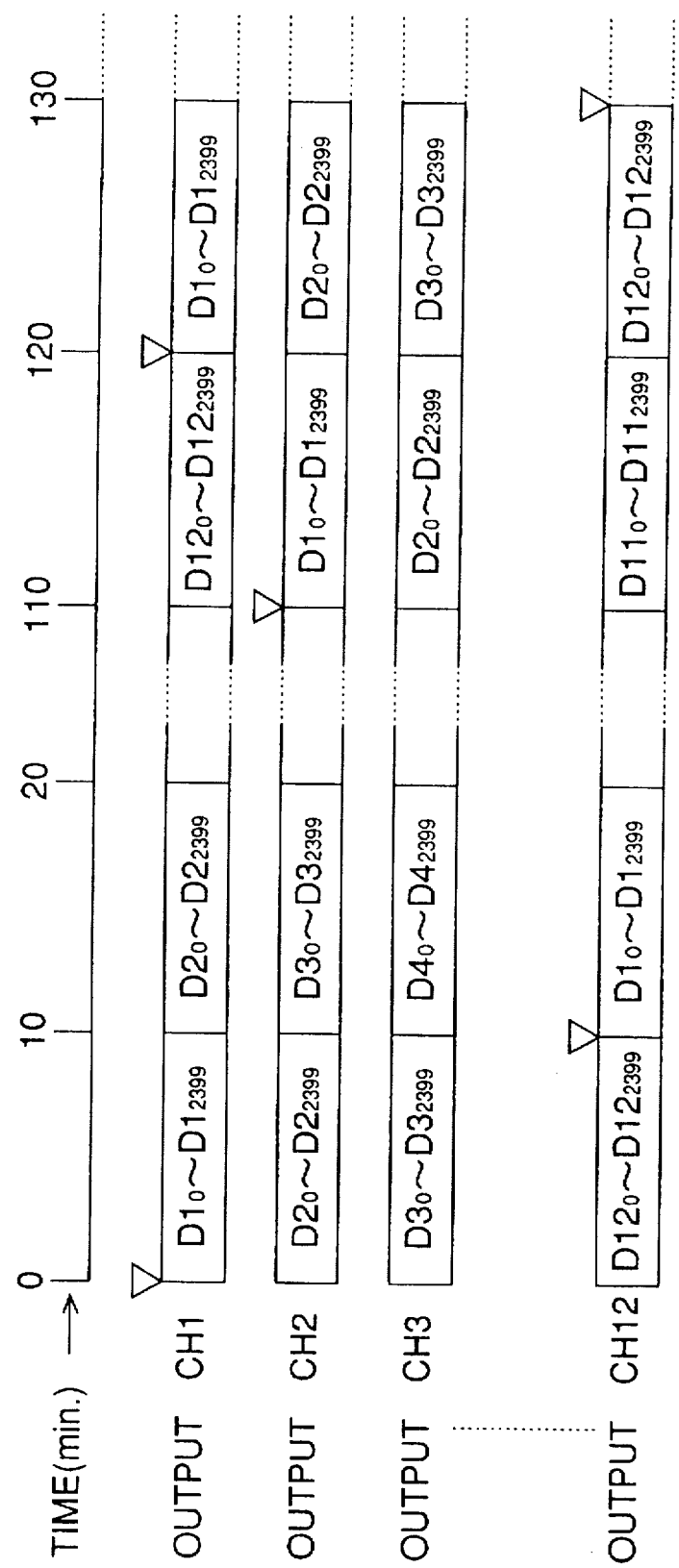

VIDEO DATA RECORDING APPARATUS AND VIDEO DATA REPRODUCING APPARATUS

BACKGROUND OF INVENTION

1. Field of the Invention

The invention relates to a video data recording apparatus and a video data reproducing apparatus used for an NVOD (near video on demand) system.

2. Description of the Related Art

A near video on demand (NVOD) system has been recently suggested. The near video on demand system produces a plurality of audio data and video data, described as AV data below, having a predetermined time interval from each other from AV data and transmits the produced AV data or analog AV signals converted from the produced AV data to viewers via a plurality of communication lines of a cable television (CATV) system etc. respectively.

In the NVOD system suggested previously, the AV data is reproduced from a recording medium such as a magnetic optical disc (MO disc) and a plurality of AV data for NVOD, described as NVOD data below, are produced by shifting the AV data by predetermined time intervals.

In the NVOD system suggested previously, every time an NVOD system is to transmit new NVOD data, data indicating a time length of the original AV data of the new NVOD data, a data rate of the new NVOD data, an arrangement of the new NVOD data on the MO disc, a number of the new NVOD data, that is, a number of communication lines needed for provision of the new NVOD data per subscriber (transmission channels) respectively, etc. must be set in an apparatus for NVOD data transmission (NVOD data reproducing apparatus) by the operator of the NVOD system.

Such a necessity of the NVOD data reproducing apparatus for manual setting of data prevents unmanned operation of the NVOD system.

SUMMARY OF THE INVENTION

A first object of the present invention is to provide a video data recording apparatus and a video data recording apparatus which do not require manual setting of data of a number of transmission channels when an NVOD system using the video data recording apparatus and video data recording apparatus is to transmit new NVOD data.

A second object of the present invention is to provide a video data recording apparatus and a video data recording apparatus which do not require manual setting of data of a number of transmission channels and a data rate of the compressed NVOD data when an NVOD system is to transmit new NVOD data.

According to a first aspect of the invention, there is provided a video data recording apparatus comprising an input means for inputting a number of channels, said number of channels indicating a plurality of channels on which a plurality of series of video data are transmitted, said plurality of series of video data being identical to an original series of data and having a predetermined time difference; a division means for dividing said digital video data into the same number of blocks of data as the number of said plurality of transmission channels and dividing said blocks of data into a predetermined number of sub-blocks of data; an arrangement conversion means for converting the arrangement of said sub-blocks of data divided by the division means into another arrangement of sub-blocks of data in accordance with a predetermined sequence; and a recording means for recording the converted arrangement of said sub-blocks of data from the arrangement conversion means and data indicating the number of channels to a recording medium.

Preferably, it further comprises a compression means for compressing said original series of video data to reduce a data rate of said original series of video data to a designated data rate and providing the compressed video data to the division means, the input means inputting data indicating said designated data rate.

More preferably, said recording means records said data indicating said designated data rate to said recording medium.

Still more preferably, said recording medium comprises a magnetic optical disc.

According to a second aspect of the invention, there is provided a video reproducing apparatus comprising a reproducing means for reproducing from a recording medium sub-blocks of data arranged into a predetermined arrangement and data indicating a number of a plurality of transmission channels for providing a plurality of series of transmission video data having a predetermined time interval from each other generated from video data for said plurality of transmission channels; a plurality of storage means for storing said sub-blocks of data reproduced by the reproducing means; a distribution means for distributing said sub-blocks of data to said plurality of storage means according to said data indicating the number of said plurality of transmission channels; and a restoring means for restoring said sub-blocks of data stored in said plurality of storage means and outputting said restored sub-blocks of data as said plurality of series of transmission video data for said plurality of transmission channels.

Preferably, said reproducing means reproduces the data indicating said designated data rate from said recording medium and said restoring means restores said sub-blocks of data at an equal data rate indicated by the reproduced data.

Preferably, it further comprises a plurality of expansion means for expanding said sub-blocks of data restored from said plurality of storage means.

More preferably, said recording medium comprises a magnetic optical disc.

According to a third aspect of the invention, there is provided a video data recording method comprising a step of inputting a number of a plurality of transmission channels for transmitting a plurality of series of transmission video data having a predetermined time interval from each other generated from an original series of video data for said plurality of transmission channels; a step of dividing said original series of video data into the same number of blocks of data as the number of said plurality of transmission channels and said blocks of data into a predetermined number of sub-blocks of data; a step of arranging the divided sub-blocks of data into a predetermined arrangement; and a step of recording said sub-blocks of data arranged into the predetermined arrangement and data indicating the number of said plurality of transmission channels in a recording medium.

According to a fourth aspect of the invention, there is provided a video data reproducing method comprising a step of reproducing from a recording medium sub-blocks of data arranged into a predetermined arrangement and data indicating a number of a plurality of transmission channels for transmitting a plurality of series of transmission video data having a predetermined time interval from each other for said plurality of transmission channels; a step of distributing said sub-blocks of data reproduced to a plurality of storage means according to said data indicating the number of said plurality of transmission channels; and a step of restoring said sub-blocks of data stored in said plurality of storage means and outputting the restored sub-blocks of data as a series of transmission video data for said transmission channels.

BRIEF DESCRIPTION OF THE DRAWINGS

These and other objects and features of the present invention will become more apparent from the following description of the preferred embodiments of the invention made with reference to attached drawings, wherein:

FIG. 9 is a view of video data produced by an NVOD method and transmitted from the video data reproducing apparatus shown in FIG. 5.

DESCRIPTION OF THE PREFERRED EMBODIMENTS

First, an NVOD data recording apparatus 2 according to an embodiment of the present invention will be explained below.

Figure 1:
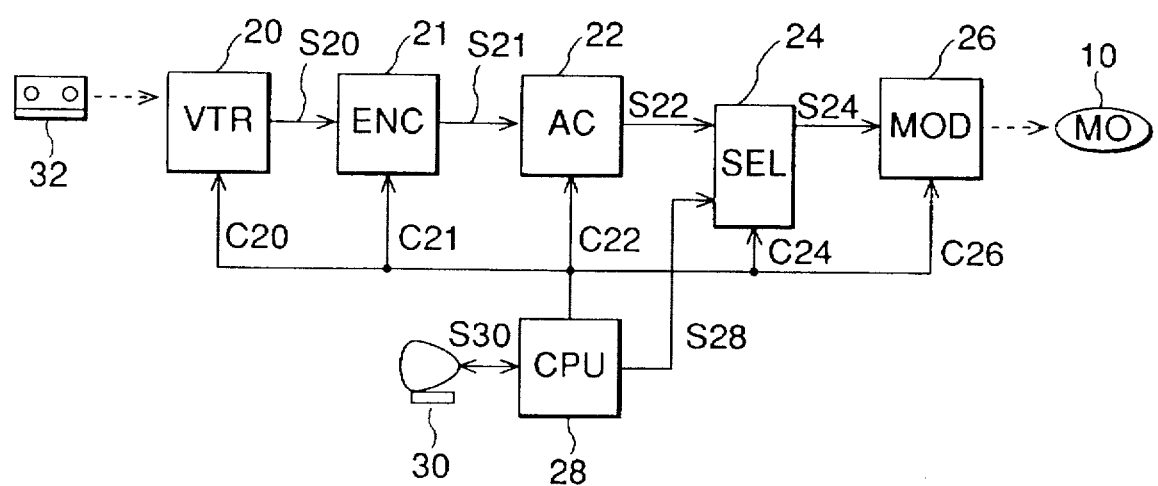
FIG. 1 is a block diagram of a video data recording apparatus according to an embodiment of the present invention.

As shown in FIG. 1, the NVOD data recording apparatus 2 is constituted by a video tape recording apparatus (VTR apparatus) 20, an encoding device 21, an arrangement conversion circuit 22, a selector circuit (SEL) 24, a magneto-optic disc apparatus (MOD) 26, a control circuit 28, and a terminal device 30, converts an arrangement of digital audio data and video data (AV data) reproduced from a video tape 32 by the VTR apparatus 20 into a predetermined arrangement suitable for generation of the NVOD data to generate digital converted data S22, and records the converted data S22 with digital control data S28 used for the generation of the NVOD data. Here, the arrangement suitable for the generation of the NVOD data will be explained later.

The control circuit 28 controls those structural elements of the NVOD data recording apparatus 2 according to handling data input by an operator of the NVOD data recording apparatus 2 and, further, generates the control data S28 to be recorded to a control data area on a magneto-optic disc (MO disc) 10 and outputs the generated control data to the selector circuit 24. Here, the handling data input from the terminal device 30 are data indicating the start and the end of the operation to the NVOD data recording apparatus 2, data recorded to the control area on the MO disc 10, etc., for example. The control data area on the MO disc 10 will be explained with reference to FIG. 2.

The VTR apparatus 20 reproduces digital AV data from the video tape 32 according to control via a control signal C20 by the control circuit 28 to provide the reproduced AV data to the encoding device 21 as AV data S20.

The encoding device 21 compresses and codes the input AV data S20 by a predetermined compression and coding method such as MPEG (motion picture experts group) to provide compressed and coded AV data to the arrangement conversion circuit 22 as AV data S21. The compression and coding operation of the encoding device 21 described above is controlled via a control signal C21 indicating a data rate of the AV data S21 by the control circuit 28.

The arrangement conversion circuit 22 converts an arrangement of the AV data S21 into an arrangement suitable for the generation of the NVOD data according to the control via control signal C22 by the control circuit 28 and outputs the same as conversion data S22 to the selector circuit 24. The process for converting the AV data S21 to the conversion data S22 will be explained below.

Figure 2:
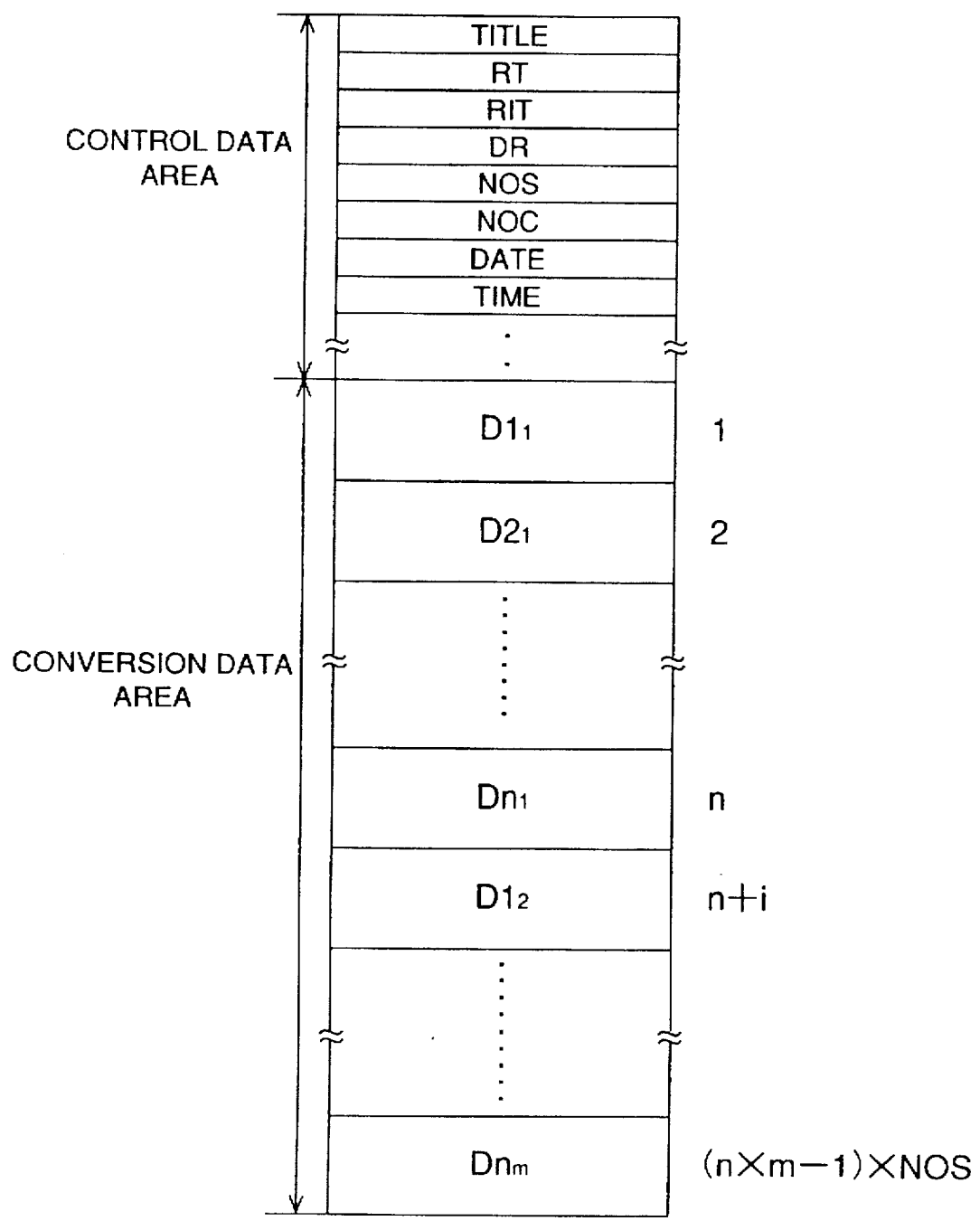
FIG. 2 is a view of an arrangement of the data recorded to a recording medium by the video data recording apparatus shown in FIG. 1.

The arrangement conversion circuit 22 divides the AV data S21 into the same number of equal parts as the number of the series of the NVOD data (transmission channels) indicated by the number of transmission channel data NOC (shown in FIG. 2). That is, when the time length of the AV data S21 is a reproducing time data RT, the arrangement conversion circuit 22 divides the AV data S21 equally into n blocks of data of which time lengths (division time) are all RT/NOC (NOC=n; n is an integer) to generate the series of AV data S21-1, S21-2, . . . , and S21-n.

Next, the arrangement conversion circuit 22 divides these series of AV data S21-1, S21-2, . . . , and S21-n into m (division number; m is an integer) sub-blocks of data to generate the AV data D1-1, D1-2, . . . , D1-m, D2-1, D2-2, . . . , D2-m, . . . , Dn-1,Dn-2, . . . and Dn-m.

Further, the arrangement conversion circuit 22 converts the arrangement of these AV data D1-1, D1-2, . . . , D1-m, D2-1, D2-2, . . . , D2-m, . . . , Dn-1,Dn-2, . . . and Dn-m into an arrangement such as AV data D1-1, D2-1, . . . , Dn-1, D1-2, D2-2, . . . , Dn-2, . . . , D1-m,D2-m, . . . and Dn-m to generate the AV data S21-1, S21-2, . . . and S21-m and outputs the resultant data as the conversion data S22. Note that, the division number m is determined according to the storage capacity of a FIFO in an NVOD data transmission apparatus 1. For example, when the data length of the series of AV data S21 is [S21], the data length |Di-j| of the AV data Di-j (i and j are integers; i=1, 2, 3, . . . , n, j=1, 2, 3, . . . , m) is [S21]/mn, and the conversion data S22 is recorded to the conversion data area on the MO disc 10 respectively, as explained below with reference to FIG. 2. Here, the NVOD data transmission apparatus 1 will be explained later with reference to FIG. 5.

The selector circuit 24 selects the conversion data S22 or the control data S28 and outputs the selected data to the MOD 26 as the selected data S24. That is, the control circuit 28 outputs the control data S28 to the selector circuit 24 and controls the selector circuit 24 to select the same to record to the control data area on the MO disc 10, and the control circuit 28 controls the arrangement conversion circuit 22 to output the conversion data S22 to the selector circuit 24 and controls the selector circuit 24 to select the same to record to the conversion data area on the MO disc 10.

The MOD 26 records the selected data S24 input from the selector circuit 24 to the MO disc 10 according to the control via the control signal C26 by the control circuit 28.

As shown in FIG. 2, the MO disc 10 is divided into the control data area and the conversion data area.

To the control data area, besides the reproducing time data RT and the number of transmission channel data NOC as explained above, data needed for the process of generation of the NVOD data in the NVOD data transmission apparatus 1, data used for the automatic operation of the NVOD data transmission apparatus 1, data used to improve the ease of operation of the NVOD data transmission apparatus 1. etc. are recorded. For example, as the data needed for the process of generation of the NVOD data in the NVOD data transmission apparatus 1, number of sector data (NOS) indicating the number of sectors needed for the recording of AV data D1-1, D1-2, . . . and Dn-m respectively and data rate data (DR) indicating a data rate of the generated NVOD data output from the NVOD data transmission apparatus 1 are recorded to the control data area, as the data used for the automatic operation of the NVOD data transmission apparatus 1, the date data (DATE), time data (TIME) indicating the date and time of transmission of the NVOD data, and the reproducing interval time data (RIT) indicating the time interval of the transmission of the NVOD data etc. are recorded to the control data area, and as the data used to improve the ease of operation of the NVOD data transmission apparatus 1, title data (TITLE) indicating the title of the AV data recorded on the MO disc 10 etc. are recorded to the control data area.

To the conversion data area on the MO disc 10, the conversion data S22 generated by the arrangement conversion circuit 22 is recorded in the arrangement after conversion. Note that, the AV data D1-1, D1-2, . . . and Dn-m included in the conversion data S22 are recorded to continuous NOS sectors of the conversion data area on the MO disc 10. However, the plurality of AV data D1-1, D1-2, . . . and Dn-m are recorded to different sectors relatively and different sub-blocks of data are not recorded in the same sector. That is, for example, the AV data D1-1 is recorded from the first sector to the (NOS)th sector of the conversion data area, and the AV data D2-1 is recorded from the (NOS+1)th sector to the (2×NOS)th sector of the conversion data area. In this way, even if there is a free area in the (NOS)th sector, the end of the AV data D1-1 and the start of the AV data D2-1 are not recorded in the (NOS)th sector in a mixed state.

Next, the conversion process will explained below in detail with reference to FIG. 3.

Figure 3:
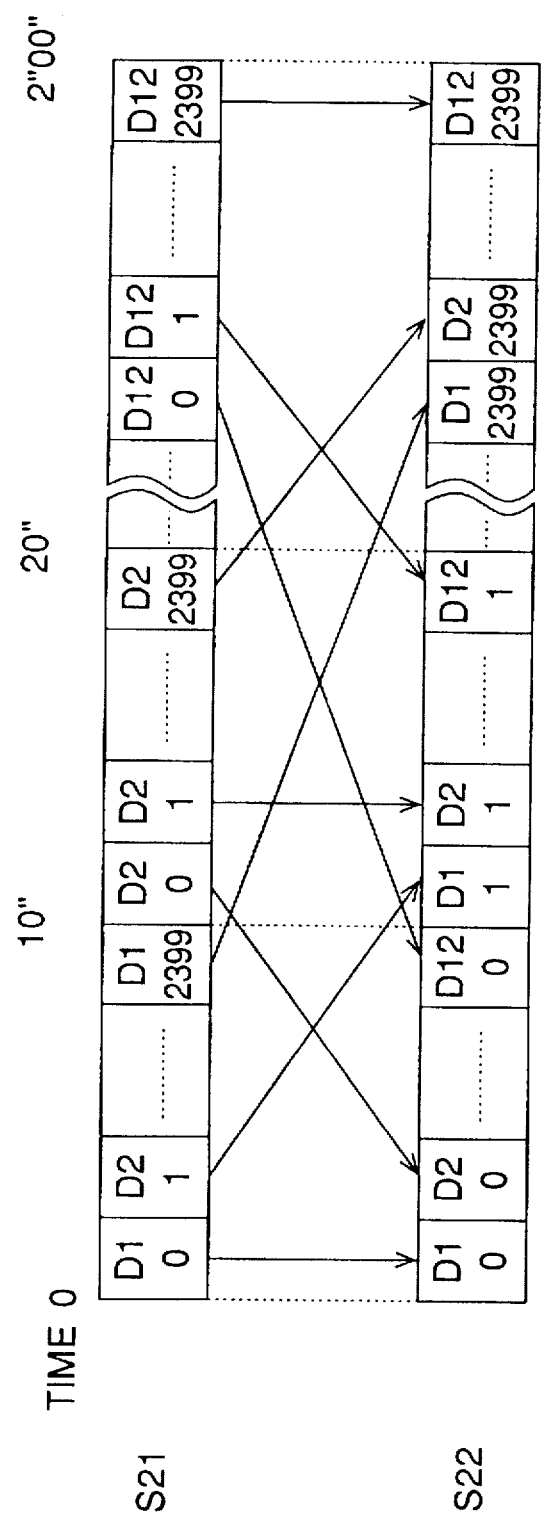
FIG. 3 is a view of a conversion process of an arrangement of sub-blocks of data by the video data recording apparatus shown in FIG. 1.

FIG. 3 shows the relation between the AV data S21 before the conversion by the arrangement conversion circuit 22 and the AV data S21 after the conversion by the arrangement conversion circuit 22. Note that, in FIG. 3, the AV data S21 before the conversion is video data of a 2-hour video program and the number of the transmission channels is 12 (n=12), that is, the value of the number of transmission channel data NOC is 12, for example.

First, the AV data S21 before the conversion is divided into 12 blocks of data, i.e., AV data D1, D2, . . . and D12. Thus, the time length of every divided block of data is 10 minutes. Further, every block of data is divided into 2,400 sub-blocks of data (m=2,400), i.e., sub-block 0, sub-block 1, . . . and sub-block 2,399. The sub-blocks of data, divided as above, are described below as sub-blocks D1-0, D1-1, D1-2, . . . , D1-2,399, D2-0, D2-1, D2-2, . . . , D2-2,399, . . . , D12-0, D12-1, D12-2, . . . , D12-2,399. Note that, the sub-block numbers are started from zero in the figures.

The arrangement of the AV data S21 is converted as shown in FIG. 3. That is, these sub-blocks of data are converted into an arrangement to gather the sub-blocks of data with the identical sub-block numbers. Thus, the arrangement of the sub-blocks of data becomes sub-blocks D1-0, D2-0, D3-0, . . . , D12-0, D1-1, D2-1, D3-1, . . . , D12-1, . . . , D1-2,399, D2-2,399, D3-2,399, . . . , D12-2,399 as shown in FIG. 3.

Figure 4:
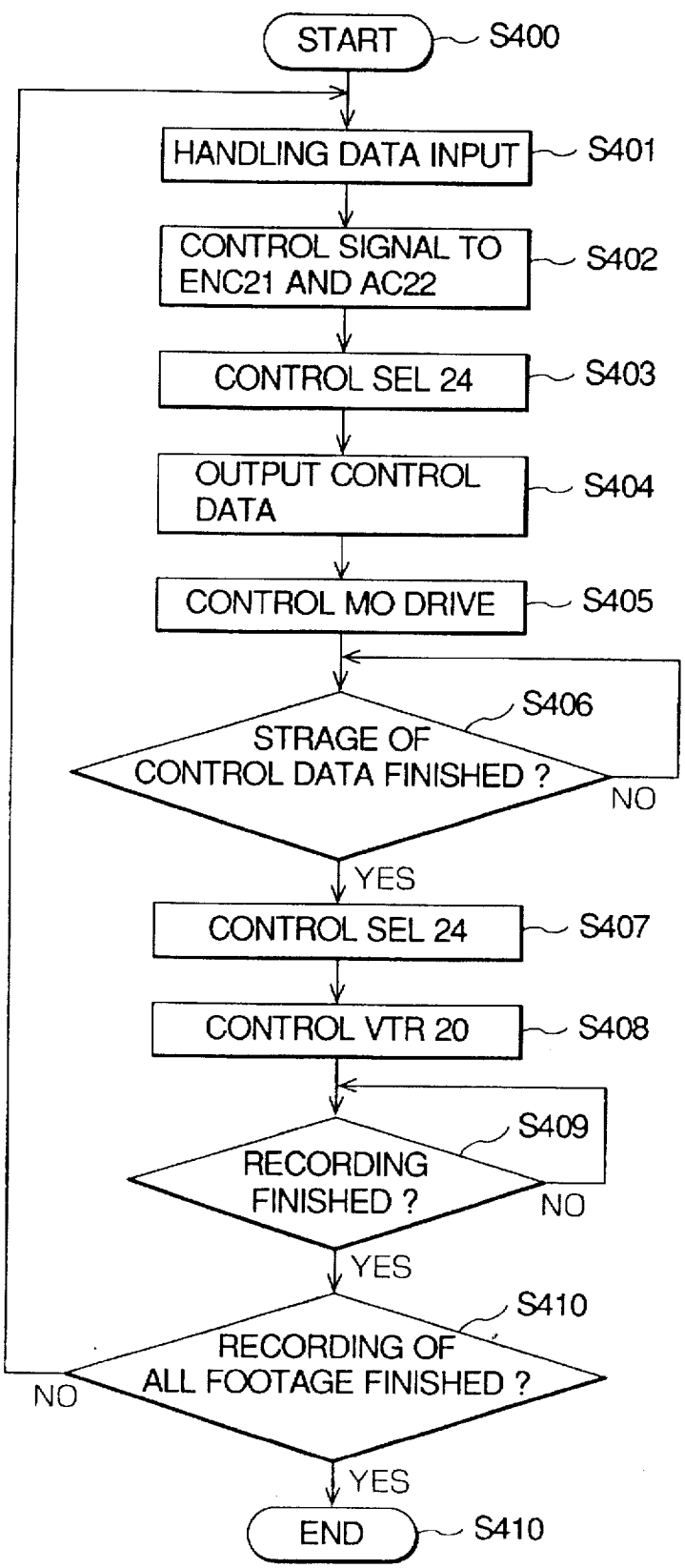
FIG. 4 is a flow chart of an example of an operation of a control circuit in the video data recording apparatus shown in FIG. 1.

Next, the Operation of the NVOD data recording apparatus 2 shown in FIG. 1 will be explained below with reference to FIG. 4. FIG. 4 is a flow chart showing an example of the operation of the control circuit 28 of the NVOD data recording apparatus 2.

As shown in FIG. 4, at step 400 (S400), the control circuit 28 starts the operation.

At step 401 (S401), the control circuit 28 receives the handling data input by an operator of the NVOD data recording apparatus 2 via the terminal device 30. As the handling data, for example, mention may be made of data such as the title of the AV data going to be recorded on the MO disc 10, reproducing time indicating a time length of the AV data, reproducing time interval indicating the time interval between the NVOD data for the transmission channels, data rate indicating a data rate of the AV data after the compression and coding process, number of sectors indicating the number of sectors needed for the recording of the AV data, number of transmission channels, and date and time indicating the start time of transmission of the NVOD data.

At step 402 (S402), the control circuit 28 supplies the control signal C21 indicating a data rate of the AV data after the compression and coding process to the encoding device 21. Further, the control circuit 28 supplies the control signal C22 including the data of the reproducing time of the AV data and the number of the transmission channels used for parameters of the arrangement conversion process to the arrangement conversion circuit 22.

At step 403 (S403), the control circuit 28 controls the selector circuit 24 to select the control data S28 from the control circuit 28.

At step 404 (S404), the control circuit 28 supplies the control data S28 including the data shown in FIG. 2, i.e., the title data TITLE, reproducing time data RT, the data rate data DR, the number of sector data NOS, the number of transmission channel data NOC, the date data DATE, and the time data TIME.

At step 405 (S405), the control circuit 28 sets the MOD 26 to the recording operation state to record the control data on the MO disc 10.

At step 406 (S406), the control circuit 28 determines whether the recording operation of the MOD 26 to record the control data S28 to the control data area on the MO disc 10 has ended or not. When the recording operation of the MOD 26 ends, the control circuit 28 proceeds to the operation of the next step (S407). The determination at step 406 is performed when the MOD 26 finishes recording the control data S28 to a predetermined number of sectors.

At step 407 (S407), the control circuit 28 controls the selector circuit 24 to select the conversion data S22 from the arrangement conversion circuit 22 via the control signal C24.

At step 408 (S408), the control circuit 28 controls the operation of the VTR apparatus 20 to start the reproducing of the AV data S20 from the video tape 32. By the control at step 408, the VTR apparatus 20 starts to reproduce the AV data S20 from the video tape 32 and provides the same to the encoding device 21, and the encoding device 21 compresses the amount of data and codes the AV data S20 to fit the data rate of the AV data S21 to the data rate indicated via the control signal C21 by the control circuit 28. The AV data S20 compressed and coded by the encoding device 21 is provided to the arrangement conversion circuit 22 as the AV data S21. The arrangement of the AV data S21 is subjected to conversion by the arrangement conversion circuit 22, and the AV data S21 is divided into sub-blocks of data and converted into the arrangement shown in FIG. 3. The AV data S22 converted in arrangement thereof by the arrangement conversion circuit 22 is supplied to the selector circuit 24 and is selected by the selector circuit 24 to be supplied to the MOD 26 as the AV data S24. The MOD 26 records the supplied AV data to the conversion data area on the MO disc 10.

At step 409 (S409), the control circuit 28 determines whether the recording of the AV data of a video program reproduced by the MOD 26 from the MO disc 10 has finished or not. The determination at step 409 is performed by the control circuit 28 comparing the number of the sectors of the MO disc 10 needed for the recording of the entire AV data S21 of a video program and the number of the sectors to which the AV data S21 of a video program is actually recorded. Here, the number of the sectors of the MO disc 10 needed for the recording of the entire AV data S21 of a video program can be calculated from the volume of the entire AV data S21 of a video program after compression and coding by the encoding device 21 and the volume of data to be recorded to a sector of the MO disc 10. When the control circuit 28 determines that the recording of the AV data S21 of a certain video program ends, the control circuit 28 proceeds to the process of the step 410.

At step 410 (S410), the control circuit 28 determines whether the recording of the AV data S21 of all of the footage, i.e., the AV data S21 of all the plurality of video programs, has finished or not. The AV data of these video programs are recorded to individual video tapes 32. These AV data of the video programs are reproduced from the individual video tapes 32, are subjected to the process of the structural elements of the NVOD data recording apparatus 2, and are recorded to individual MO discs 10 respectively. The control circuit 28 proceeds to the process of the step 401 before the recording of the whole footage of all of the video programs ends. Otherwise, when the recording of the whole footage of all of the video programs ends, the control circuit 28 proceeds to the process of step 411 to end the operation.

Next, an NVOD data transmission apparatus 1 of the present invention will be explained below.

Figure 5:
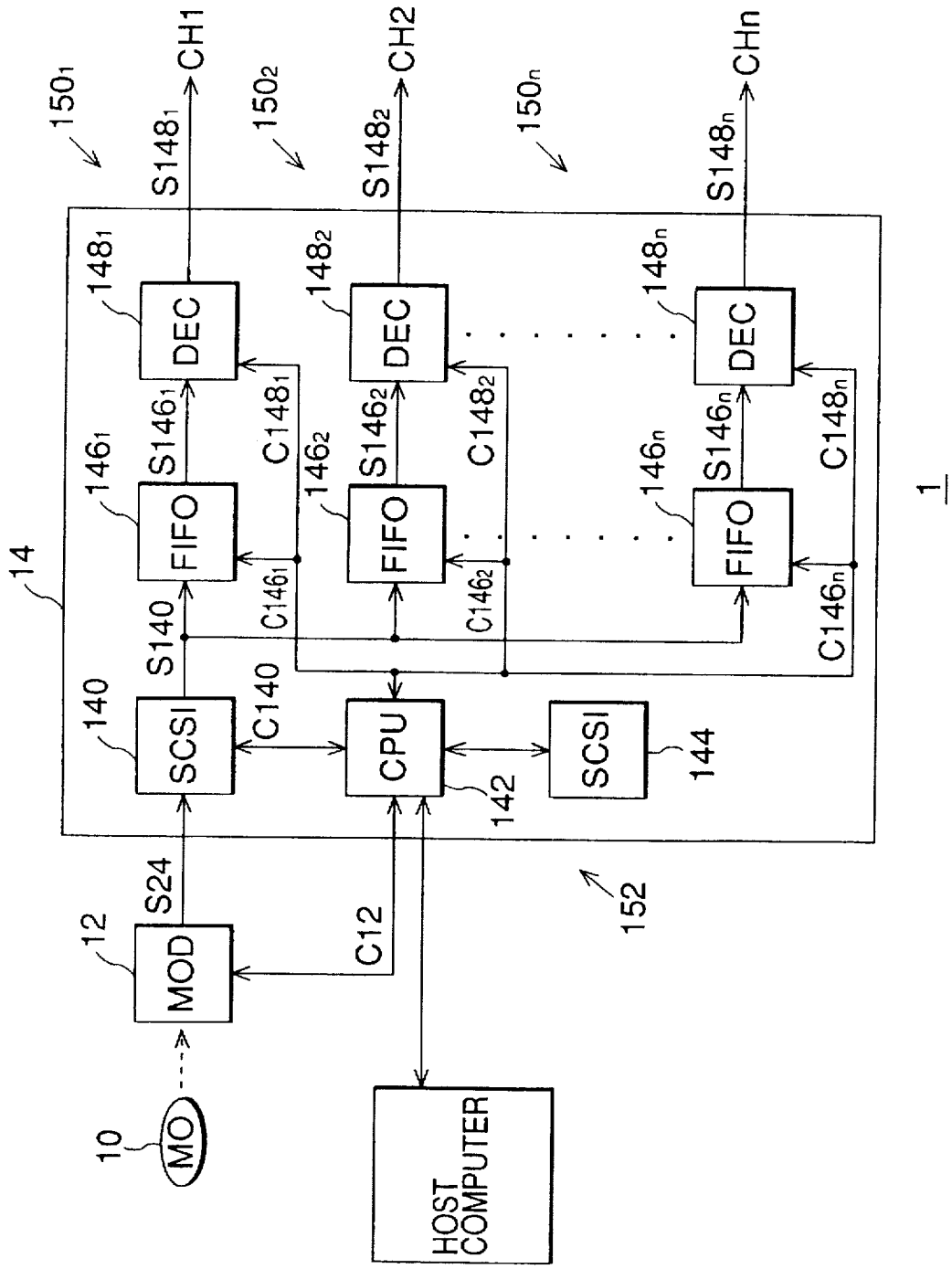
FIG. 5 is a block diagram of a video data reproducing apparatus according to an embodiment of the present invention.

As shown in FIG. 5, the NVOD data transmission apparatus 1 is constituted by an magnetic optical disc apparatus (MOD) 12 and an NVOD data generation apparatus 14 and is connected with a host computer 15. The NVOD data generation apparatus 14 is constituted by a SCSI (small computer system interface) interface circuit (SCSI) 140 (described as SCSI IF 140 below) and a plurality of NVOD data generation units 150-1, 150-2, . . . , and 150-n and a control device 152. The NVOD data generation units 150-1, 150-2, . . . , and 150-n are constituted by FIFO memory circuits (FIFO) 146-1, 146-2, . . . , and 146-n and decoding devices 148-1, 148-2, . . . , and 148-n (DEC) respectively. The control device 152 is constituted by a control circuit 142 comprising a CPU and a memory circuit 144 comprising RAM's. The NVOD data transmission apparatus 1 reproduces the control data and the conversion data recorded to the MO disc 10 as shown in FIG. 2, generates NVOD data S146-1, S146-2, . . . , and S146-n according to the reproduced control data, and decodes and expands the generated NVOD data to transmit audio and video signals (AV signals) S148-1, S148-2, . . . , and S148-n to communication lines (transmission channels) CH1, CH2, . . . , and CHn.

The control circuit 142 (and the memory circuit 144) of the control device 152 control the constitutional elements of the NVOD data transmission apparatus 1 according to control data input from the SCSI IF 140 via a bi-directional control signal C12.

The MOD 12 reproduces the control data and the conversion data recorded to the control data area and the conversion data area on the MO disc 10 respectively as shown in FIG. 2 according to the control by the control circuit 142 via a control signal C12 and provides the same to the SCSI IF 140 of the NVOD data generation apparatus 14 as reproduced data S24.

The SCSI IF 140 carries out the interface processing for the reproduced data S24 from the MOD 12, divides the control data and the conversion data from the reproduced data S24, provides the divided control data to the control circuit 142 via the control signal C140, and provides the divided conversion data to the FIFO memory circuits 146-1, 146-2, . . . and 146-n as AV data 22.

The FIFO memory circuits 146-1, 146-2, . . . , and 146-n buffer the AV data D1, D1-2, . . . , D1-m, D2-1, D2-2, D2-m, . . . , Dn-1,Dn-2, . . . and Dn-m (FIG. 3) output to corresponding transmission channels from the input AV data S22 to generate the NVOD data S146-1, S146-2, . . . , and S146-n and output the generated NVOD data S146-1, S146-2, . . . , and S146-n t o the decoding devices 148-1, 148-2, . . . , and 148-n at a data rate indicated by the data rate data DR (FIG. 2) respectively. That is, the control circuit 142 controls each FIFO memory circuit 146-i to buffer the AV data reproduced from the [(i+nj-n-1)xNOS+1]th sector, . . . , and the [(i+nj-n-1)xNOS]th sector of the conversion data area on the MO disc 10 (i and j are integers; i=1, 2, 3, . . . n, j=1, 2, 3, . . . , m). More concretely, the control circuit 142 controls the FIFO memory circuit 146-1 to buffer the AV data D1-1, D1-2, . . . , and D1-m, the FIFO memory circuit 146-2 to buffer the AV data D2-1, D2-2, and D2-m, other FIFO memory circuits 146-i to buffer the AV data Di-1, Di-2, . . . , and Di-m, similarly, and the FIFO memory circuit 146-n to buffer the AV data Dn-1, Dn-2, . . . , and Dn-m, and these FIFO memory circuits 146-1, 146-2, . . . , and 146-n to output the buffered AV data at the data rate indicated by the data rate data DR respectively.

The decoding devices 148-1, 148-2, . . . , and 148-n expand and decode the NVOD data S146-1, S146-2, . . . , and S146-n input from the FIFO memory circuits 146-1, 146-2, . . . , and 146-n in correspondence with the data rates thereof according to the control by the control circuit 142 via control signals C148-1, C148-2, . . . , and C148-n to generate AV signals S148-1, S148-2, . . . , and S148-n and transmit the resultant data to viewers via the transmission channels CH1, CH2, . . . , and CHn respectively.

Figure 6:
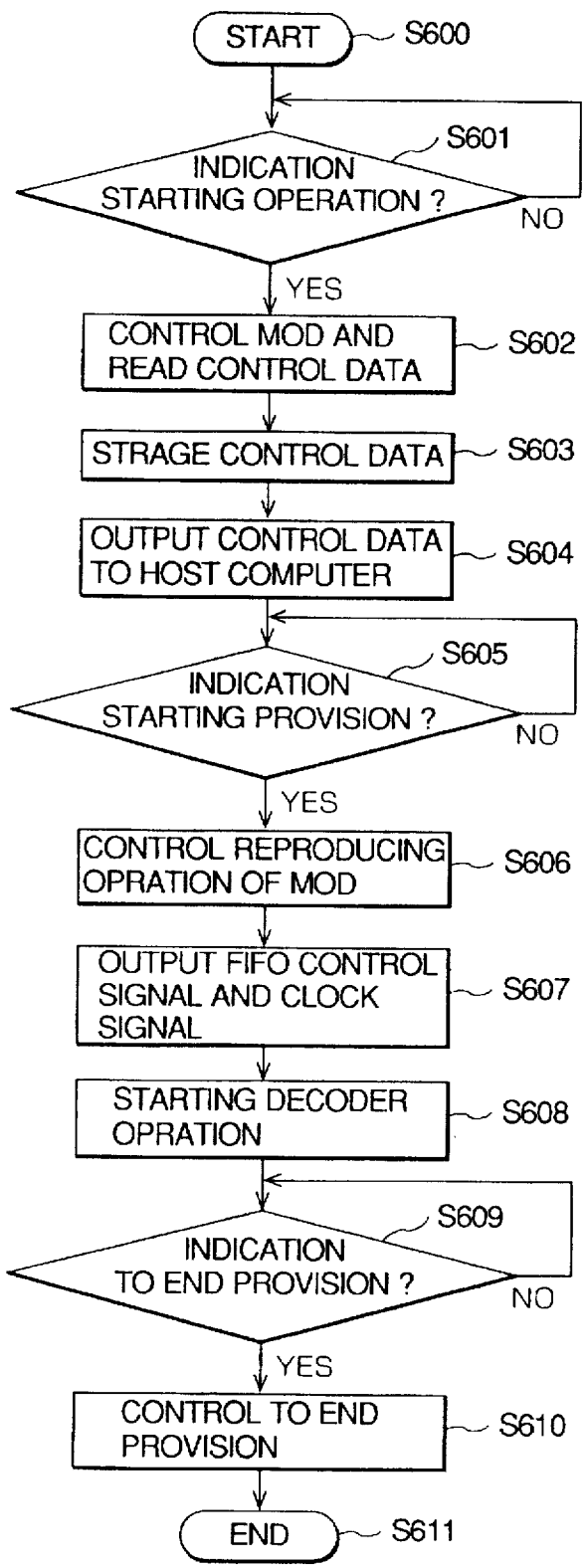
FIG. 6 is a flow chart of an example of an operation of a control circuit in the video data reproducing apparatus shown in FIG. 5.
Figure 7:
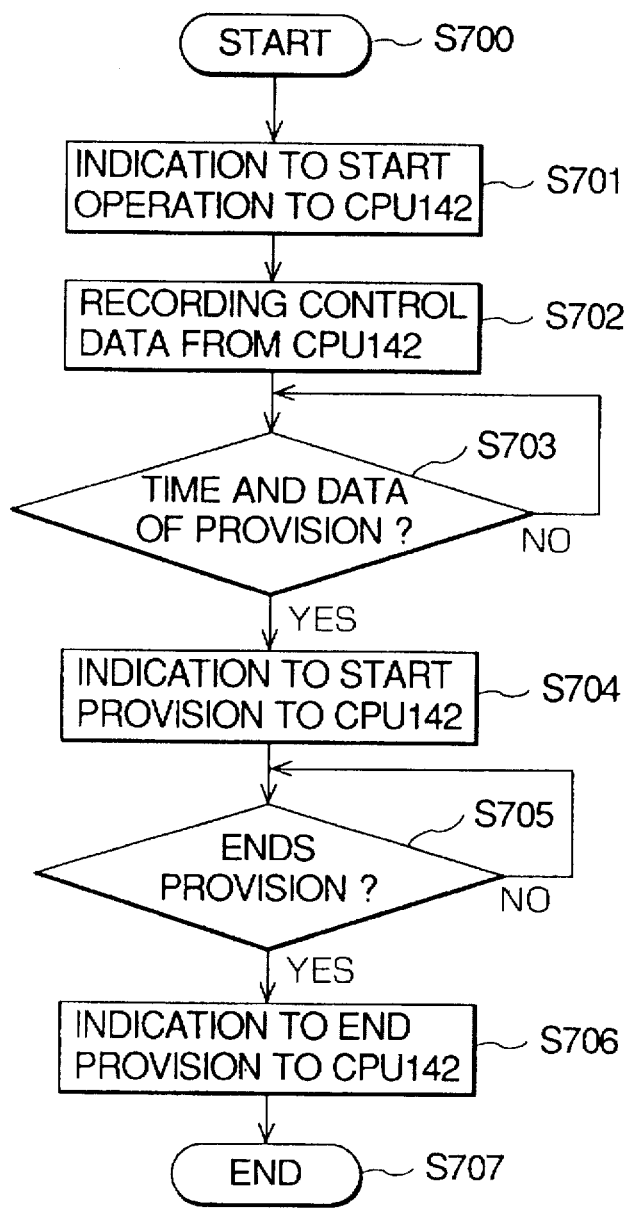
FIG. 7 is a flow chart of an example of an operation of a host computer in the video data reproducing apparatus shown in FIG. 5.

The operation of the NVOD data transmission apparatus 1 shown in FIG. 5 will be explained with reference to the flow charts shown in FIG. 6 and FIG. 7.

First, the operation of the control circuit 142 of the control device 152 will be explained with reference to the flow charts shown in FIG. 6 and FIG. 7.

At step 600 (S600), the control circuit 142 starts the operation.

At step 601 (S601), the control circuit 142 determines whether an indication to start the operation is input from the host computer 15 in connection with the NVOD data transmission apparatus 1 or not. In this step 601, when the indication to start the operation from the host computer 15 is determined, the control circuit 142 proceeds to the process of the next step 602. The operation of the host computer 15 will be explained later.

At step 602 (S602), the control circuit 142 controls the MOD 12 to reproduce the control data from the control area on the MO disc 10 and provides the same to the control circuit 142 via the SCSI IF 140.

At step 603 (S603), the control circuit 142 stores the input control data in the memory circuit 144.

At step 604 (S604), the control circuit 142 reads the stored control data from the memory circuit 144 and provides the same to the host computer 15.

At step 605 (S605), the control circuit 142 determines whether an indication to start transmission is input from the host computer 15 or not. The host computer 15 is programmed to provide the indication to start transmission to the NVOD data transmission apparatus 1 when the date and time of the transmission of the AV signal S148-1, S148-2, . . . , and S148-n are reached according to the time data TIME and date data DATE included in the control data input from the control circuit 142 in the step 604. The operation of the host computer 15 at step 605 will be explained later with reference to FIG. 7.

At step 606 (S606), when the control circuit 142 determines the input of the indication to start transmission at step 605, the control circuit 142 executes the control process to designate the data rate of the AV data S24 reproduced from the MO disc 10 and the reproducing area on the MO disc 10 according to the control data stored in the memory circuit 144, especially the data rate data DT and the number of sector data NOS (FIG. 2).

Next, at step 607 (S607), the control circuit 142 executes the read/write control process for the FIFO memory circuits 146-1, 146-2, . . . , and 146-n and the generation process of a clock signal supplied to the FIFO memory circuits 146-1, 146-2, . . . , and 146-n via control signal C146-1, C146-2, . . . , and C146-n respectively according to the control signal stored in the memory circuit 144, especially the data rate data DT, the number of sector data NOS, and the number of transmission channel data NOC. The operation of the control circuit 142 at step S607 will explained later with reference to FIG. 8 in detail.

Next, at step 608, the control circuit 142 controls the decoding devices 148-1, 148-2, . . . , and 148-n to start operation via the control signals C148-1, C148-2, . . . , and C148-n.

Next, at step 609, the control circuit 142 determines whether an indication to end the transmission of the AV signals S148-1, S148-2, . . . , and S148-n is input from the host computer 15 or not.

When the control circuit 142 determines that the indication to end the transmission of the AV signals S148-1, S148-2, . . . , and S148-n is not input, the control circuit 142 returns to the process of step 606 and repeats the processes of step 606, step 607, and step 608. When the control circuit 142 determines the completion of the reproduction of the whole AV data recorded to the MO disc 10 after the repetition of the processes of step 606, step 607, and step 609, the control circuit 142 executes control to reproduce the AV data from the start of the same again. However, in the second reproduction of AV data from the MO disc 10, the control circuit 142 controls the FIFO memory circuit 146-1 to buffer the AV data D2-1, D2-2, . . . , and D2-m from the AV data S22, the FIFO memory circuit 146-2 to buffer the AV data D3-1, D3-2, . . . , and D3-m from the AV data S22, similarly, the FIFO memory circuit 146-(n-1) to buffer the AV data Dn-1, Dn-2, and Dn-m from the AV data S22 and the FIFO memory circuit 146-n to buffer the AV data D1-1, D1-2, . . . , D1-m from the AV data S22. That is, the block number h of the AV data Dh-j buffered in the FIFO memory circuits 146-i is shifted once every reproduction of the whole AV data from the MO disc 10, more concretely, in the (k)th reproduction of the AV data from the MO disc 10, the FIFO memory circuits 146-i buffer the AV data Dh-j (k and h are integers, h=<n:i+k−2>+1, <x:y> means a remainder of y for x). Thus, in the third reproduction of the AV data from the MO disc 10, the FIFO memory circuit 146-1 buffers the AV data D3-1, D3-2, . . . , and D3-m, for example, and the FIFO memory circuits 146-i continue the buffering similarly shifting the block numbers.

When the control circuit 142 determines that the indication to end the transmission of the AV signals S148-1, S148-2, . . . , and S148-n is input, the control circuit 142 proceeds to the process of step 610.

At step 610, the control circuit 142 controls the MOD 12, the FIFO memory circuits 146-1, 146-2, . . . , and 146-n, and the decoding devices 148-1, 148-2, . . . , and 148-n to end the transmission of the AV signals S148-1, S148-2, . . . . and S148-n.

At step 611 (S611), the control circuit 142 ends the control operation.

Next, the operation of the host computer 15 will be explained below with reference to the flow chart shown in FIG. 7.

At step 700 (S700), the host computer 15 starts the operation.

At step 701 (S701), the host computer 15 provides the data directing the control circuit 142 to start the operation.

At step 702 (S702), the host computer 15 receives the control data, i.e., the title data TITLE, the reproducing time data RT, the reproducing interval time data RIT, the data rate data DR, the number of sector data NOS, the number of the transmission channel NOC, the date data DATE, and the time data TIME (FIG. 2).

At step 704 (S704), the host computer 15 determines whether the hour indicated by the date data DATE and the time data TIME has come or not. When the hour indicated by the date data DATE and the time data TIME comes, the host computer 15 proceeds to the process of the next step.

At step 705 (S705), the host computer 15 determines whether the AV signal S148-1, S148-2, . . . , and S148-n of a video program are transmitted to the viewers for a predetermined times or not, that is, the host computer 15 determines whether to stop the transmission or not. When the host computer 15 stops the transmission, the host computer 15 proceeds to the process of step 706.

At step 706 (S706), the host computer 15 provides the data indicating the end of the transmission to the control circuit 142.

At step 707 (S707), the host computer 15 ends the operation.

Next, the distribution of the AV data S22 to the FIFO memory circuits 146-1, 146-2, . . . , and 146-n and restoration from the FIFO memory circuits 146-1, 146-2, ..., and 146-n will be explained below with reference to FIG. 8. Note that, the AV data recorded to the MO disc 10 is described as data S22 in FIG. 8.

Figure 8:
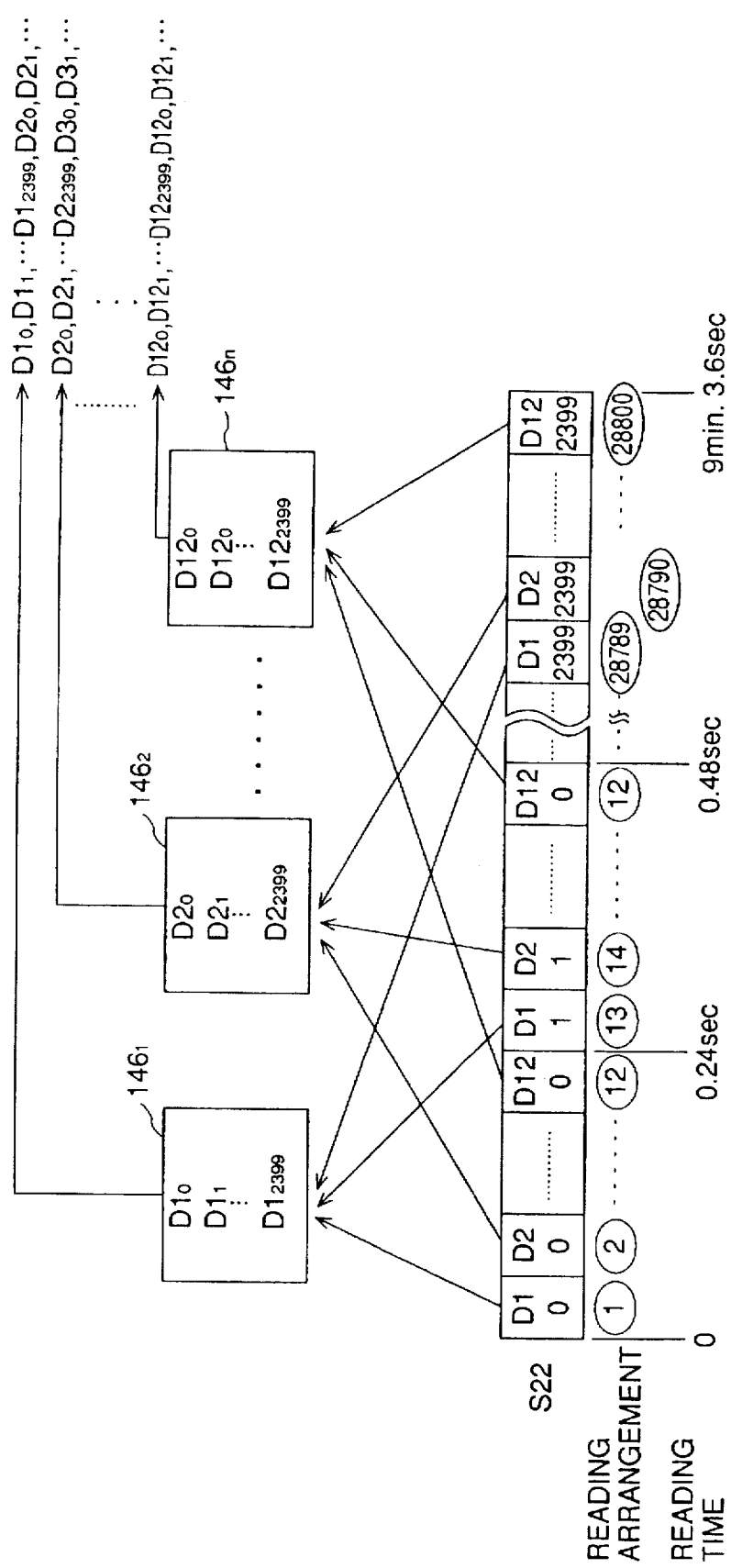
FIG. 8 is a view of a reproducing process of sub-blocks of data by the video data reproducing apparatus shown in FIG. 5.

These sub-blocks of data D1-0, D2-0, ..., D12-0, D1-2, D2-2, ..., D12-2, ..., D1-2,399, D2-2,399, ..., D12-2,399, described as data S22 in FIG. 8, are reproduced by the MOD 12 to be provided to the SCSI IF 140 from the head in this arrangement. Then, the sub-blocks of data D1-0, D2-0, ..., D12-0, D1-2, D2-2, ..., D12-2, ..., D1-2,399, D2-2,399, ..., D12-2,399 output from the SCSI IF 140 are stored to the FIFO memory circuits 146-1, 146-2, ..., and 146-n respectively as shown in FIG. 8. That is, the control circuit 142 supplies the control data and the clock signal via the control signal S146-1, S146-2, ..., and S146-n to the FIFO memory circuits 146-1, 146-2, ..., and 146-n respectively. According to these control signal and clock signal, the sub-blocks of data D1-0, D1-2, D1-3, ..., D1-2,399 are stored into the FIFO memory circuits 146-1 in this arrangement, the sub-blocks of data D2-0, D2-2, D2-3, ..., D2-2,399 are stored into the FIFO memory circuit 146-2 in this arrangement, similarly, the sub-blocks of data D12-0, D12-2, D12-3, ..., D12-2,399 are stored into the FIFO memory circuit 146-n in this arrangement. Here, the control circuit 142 is constituted to determine the one of the FIFO memory circuits 146-1, 146-2, ..., and 146-n to which the sub-blocks of data reproduced from the MO disc 10 by the MOD 12 is needed to be recorded at that time, according to the data indicating the place of the sector of the MO disc 10 from which the sub-blocks of data is reproduced by the MOD 12 at that time and the control data stored in the memory circuit 144, and further the control circuit 142 is constituted to provide a read control signal and a read clock signal to the FIFO memory circuits 146-1, 146-2, ..., and 146-n respectively. The frequency of this read clock signal is selected to be in accordance with the data rate indicated by the control data stored in the memory circuit 144, and the sub-blocks of data are read from the FIFO memory circuits 146-1, 146-2, ..., and 146-n respectively at the data rate indicated by the control data stored in the memory circuit 144.

Consequently, as shown in FIG. 8, the sub-blocks of data D1-0, D1-1, D1-2, ..., D1-2,399 are restored from the FIFO memory circuit 146-1 in this arrangement, the sub-blocks of data D2-0, D2-1, D2-2, ..., D2-2,399 are restored from the FIFO memory circuit 146-2 in this arrangement, similarly, the sub-blocks of data D12-0, D12-1, D12-2, ..., D12-2,399 are restored from the FIFO memory circuit 146-n in this arrangement. Then, the sub-blocks of data restored from the FIFO memory circuits 146-1, 146-2, ..., and 146-n are input to the decoding devices 148-1, 148-2, ..., and 148-n respectively.

The decoding devices 148-1, 148-2, ..., and 148-n expand and decode the sub-blocks of data input from the FIFO memory circuits 146-1, 146-2, ..., and 146-n and transmit them to the transmission channels CH1, CH2, ..., and CHn as the AV signals S148-1, S148-2, ..., and S148-n respectively.

The AV signals S148-1, S148-2, ..., and S148-n having 10 minute intervals from each other are transmitted to these transmission channels CH1, CH2, ..., and CHn by the operation of the NVOD data transmission apparatus 1 as explained above. Thus, the viewers can watch a video program from its start by waiting for a maximum of 10 minutes.

As explained above, the operator of the NVOD data recording apparatus 2 inputs the title data TITLE, the reproducing time data RT, the reproduction interval time data RIT, the data rate data DR, the number of sector data NOS, the number of transmission channel data NOC, the date data DATE, and the time data TIME to the control circuit 142 of the NVOD data recording apparatus 2 from the terminal device 30 as the handling data. Then the control circuit 142 controls the VTR apparatus 20 to reproduce the AV data S20 from the video tape 32.

The NVOD data recording apparatus 2 converts the arrangement of the AV data reproduced from the video tape 32 into the arrangement suitable for the NVOD data generation process and records the resultant conversion data S22 to the predetermined areas on the MO disc 10 with the control data (FIG. 2). The MO disc 10 to which the conversion data and the control data are recorded is set to the MOD 12 of the NVOD data transmission apparatus 1.

At first, the control circuit 142 of the NVOD data transmission apparatus 1 controls the MOD 12 etc. to reproduce the control data S22 from the control data area on the MO disc 10 and stores the reproduced control data to the memory circuit 144. Then, the control circuit 142 starts the operation for generation of the AV signals S148-1, S148-2, ..., and S148-n at the time and the date designated by the date data DATE and the time data TIME.

Next, the control circuit 142 controls the MOD 12 and the SCSI IF 140 to reproduce the conversion data S22 and controls the FIFO memory circuits 146-1, 146-2, ..., and 146-n to generate the NVOD data S146-1, S146-2, ..., and S146-n.

Then, the control circuit 142 controls the decoding devices 148-1, 148-2, ..., and 148-n to expand the NVOD data S146-1, S146-2, ..., and S146-n and transmit the results to the transmission channels CH1, CH2, ..., and CHn respectively.

Here, the arrangement of the contents of the control data and the conversion data is an example and the other data can be added to those data.

Also, the division time (RT/NOS) can be recorded at the control data area on the MO disc 10 instead of the reproducing interval time RT and the number of transmission channel data NOC, for example.

Also, the number of the NVOD data generation units 150-1, 150-2, ..., and 150-n is an example. The number of the NVOD data generation units 150-1, 150-2, ..., and 150-n can be different from the number of the transmission channels, i.e., the value of the number of the series of the transmission channel data NOC.

Also, it is possible that the NVOD data transmission apparatus 1 be equipped with a plurality of the MOD's 12 to generate the different plurality of series of NVOD data reproduced from the control data and the conversion data and transmit the same to the transmission channels.

Also, when the transmission channels are digital communication lines, the decoding devices 148-1, 148-2, ..., and 148-n can be omitted.

Also, the constitutional elements of the NVOD data transmission apparatus 1 and the NVOD data recording apparatus 2 can be realized by software or hardware to the extent that they have the same features and performance.

The video data recording apparatus and the video data reproducing apparatus according to the present invention have the effects that the manual setting of data of a number of transmission channels can be eliminated at the time when a NVOD system using the same is to transmit new NVOD data.

I claim:

1. A video data recording apparatus comprising:

an input means for inputting a number of channels, said number of channels indicating a plurality of channels on which a plurality of series of digital video data are transmitted, said plurality of series of digital video data being identical to an original series of data and having a predetermined time difference:

a division means for dividing said digital video data into the same number of blocks of data as the number of said plurality of transmission channels and dividing said blocks of data into a predetermined number of sub-blocks of data;

an arrangement conversion means for converting the arrangement of said sub-blocks of data divided by the division means into another arrangement of sub-blocks of data in accordance with a predetermined sequence; and a recording means for recording the converted arrangement of said sub-blocks of data from the arrangement conversion means and data indicating the number of channels to a recording medium.

2. A video data recording apparatus according to claim 1, further comprising a compression means for compressing said original series of video data to reduce a data rate of said original series of video data to a designated data rate and providing the compressed video data to the division means, the input means inputting data indicating said designated data rate.

3. A video data recording apparatus according to claim 2, wherein said recording means records said data indicating said designated data rate to said recording medium.

4. A video data recording apparatus according to claim 3, wherein said recording medium comprises a magnetic optical disc.

5. A video reproducing apparatus comprising:

a reproducing means for reproducing from a recording medium sub-blocks of data arranged into a predetermined arrangement and data indicating a number of a plurality of transmission channels for providing a plurality of series of transmission video data having a predetermined time interval from each other generated from video data for said plurality of transmission channels;

a plurality of storage means for storing said sub-blocks of data reproduced by the reproducing means;

a distribution means for distributing said sub-blocks of data to said plurality of storage means according to said data indicating the number of said plurality of transmission channels; and a restoring means for restoring said sub-blocks of data stored in said plurality of storage means and outputting said restored sub-blocks of data as said plurality of series of transmission video data for said plurality of transmission channels.

6. A video reproducing apparatus according to claim 5, wherein said reproducing means reproduces data indicating a designated data rate from a recording medium.

said restoring means restores said sub-blocks of data at an equal data rate indicated by the reproduced designated data rate.

7. A video reproducing apparatus according to claim 5, further comprising:

a plurality of expansion means for expanding said sub-blocks of data restored from said plurality of storage means.

8. A video reproducing apparatus according to claim 6, wherein said recording medium comprises a magnetic optical disc.

9. A video data recording method comprising:

a step of inputting a number of a plurality of transmission channels for transmitting a plurality of series of transmission video data having a predetermined time interval from each other generated from an original series of video data for said plurality of transmission channels;

a step of dividing said original series of video data into the same number of blocks of data as the number of said plurality of transmission channels and said blocks of data into a predetermined number of sub-blocks of data;

a step of arranging the divided sub-blocks of data into a predetermined arrangement; and a step of recording said sub-blocks of data arranged into the predetermined arrangement and data indicating the number of said plurality of transmission channels in a recording medium.

10. A video data reproducing method comprising:

a step of reproducing from a recording medium sub-blocks of data arranged into a predetermined arrangement and data indicating a number of a plurality of transmission channels for transmitting a plurality of series of transmission video data having a predetermined time interval from each other for said plurality of transmission channels;

a step of distributing said sub-blocks of data reproduced to a plurality of storage means according to said data indicating the number of said plurality of transmission channels; and a step of restoring said sub-blocks of data stored in said plurality of storage means and outputting the restored sub-blocks of data as the series of transmission video data for said transmission channels.

* * * * *